US006802151B1

(12) United States Patent
Jochum

(10) Patent No.: US 6,802,151 B1
(45) Date of Patent: Oct. 12, 2004

(54) METHOD AND APPARATUS FOR PREVENTING TANGLING OF A FISHING LINE

(76) Inventor: Wolfgang Jochum, 2645 Ridge St., Yorktown Heights, NY (US) 10598

( * ) Notice: Subject to any disclaimer, the term of this patent is extended or adjusted under 35 U.S.C. 154(b) by 0 days.

(21) Appl. No.: 10/681,653

(22) Filed: Oct. 7, 2003

(51) Int. Cl.$^7$ .............................................. A01K 87/04
(52) U.S. Cl. ............................................ 43/24; 43/25
(58) Field of Search ................... 43/24, 25; D22/143

(56) References Cited

U.S. PATENT DOCUMENTS

| | | | | |
|---|---|---|---|---|
| 3,545,119 A | * | 12/1970 | Murnan | 43/25 |
| 3,624,798 A | * | 11/1971 | Fleischer | 242/277 |
| 3,654,722 A | * | 4/1972 | Camilleri | 43/25 |
| 3,769,737 A | * | 11/1973 | Miyamae | 242/273 |
| 3,927,488 A | * | 12/1975 | Peddy | 43/25 |
| 4,156,983 A | * | 6/1979 | Moore | 43/25 |
| 5,822,910 A | * | 10/1998 | Shewmake | 43/25 |
| 6,418,658 B1 | * | 7/2002 | Knickrehm | 43/25 |

* cited by examiner

*Primary Examiner*—Jack Keith
*Assistant Examiner*—Bret Hayes
(74) *Attorney, Agent, or Firm*—Darby & Darby

(57) ABSTRACT

An apparatus and method are described for reducing or preventing tangling of a fishing line that passes through one or more guides on a fishing rod. The apparatus includes a housing and a clamp operative to secure the housing to the fishing rod. A bore extends through the housing, and a slot is provided which is in communication with the bore and which is sized to receive the fishing line. A gate rigidly disposed relative to the housing impedes free passage of the fishing line from the bore and into the slot. The method includes placing the fishing line under tension in a tensioner that is connected to a fishing rod at a point along the length of the fishing rod that is distal to, yet proximate to, a reel; and reeling in the fishing line onto the reel while maintaining tension to the reel.

13 Claims, 5 Drawing Sheets

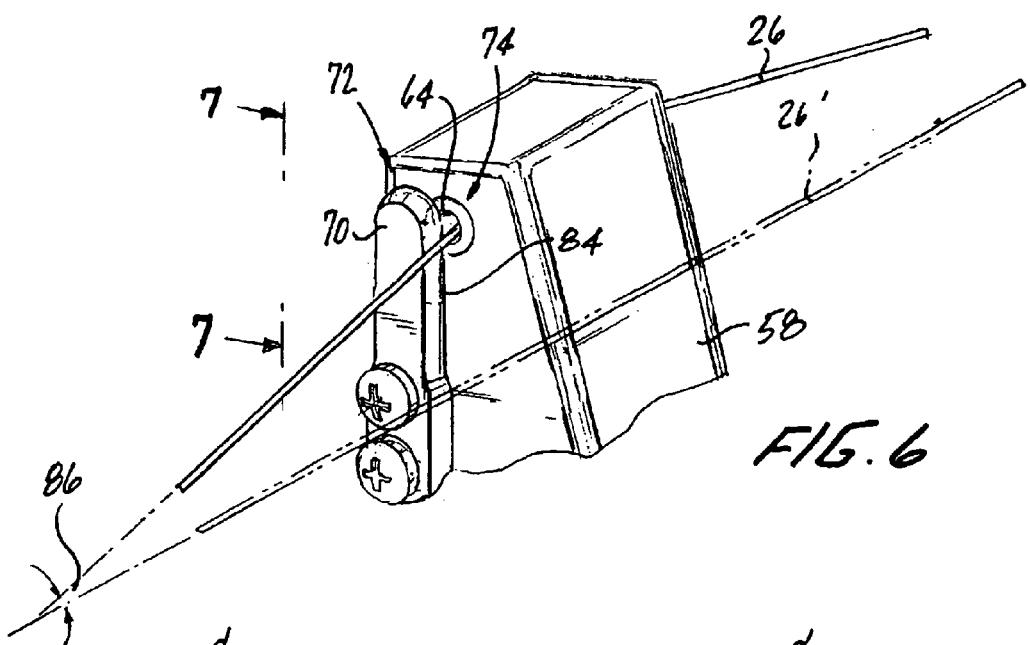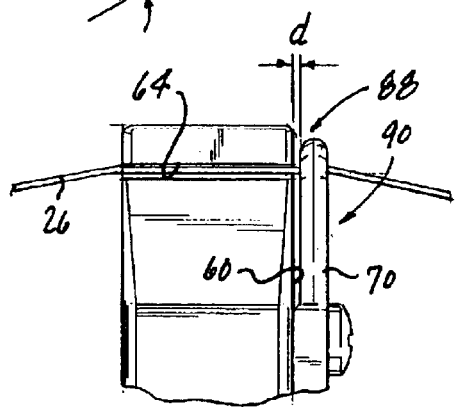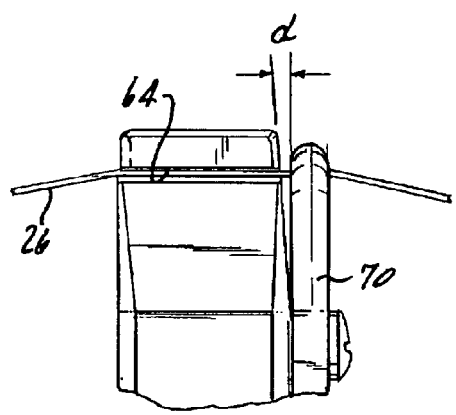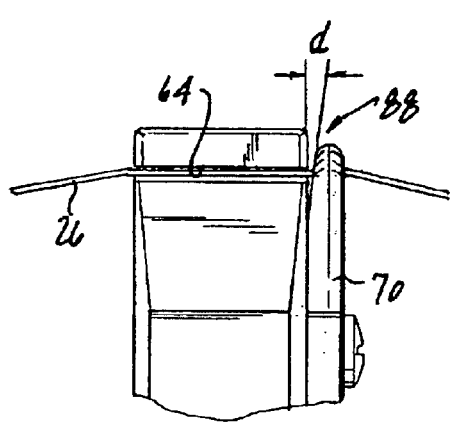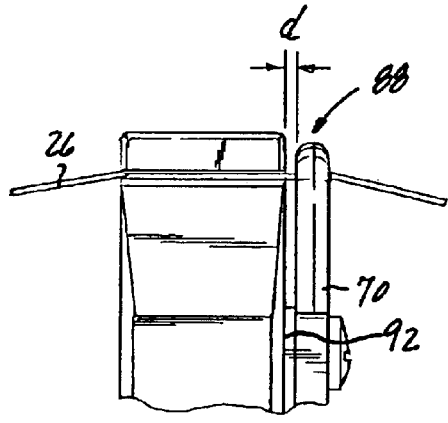

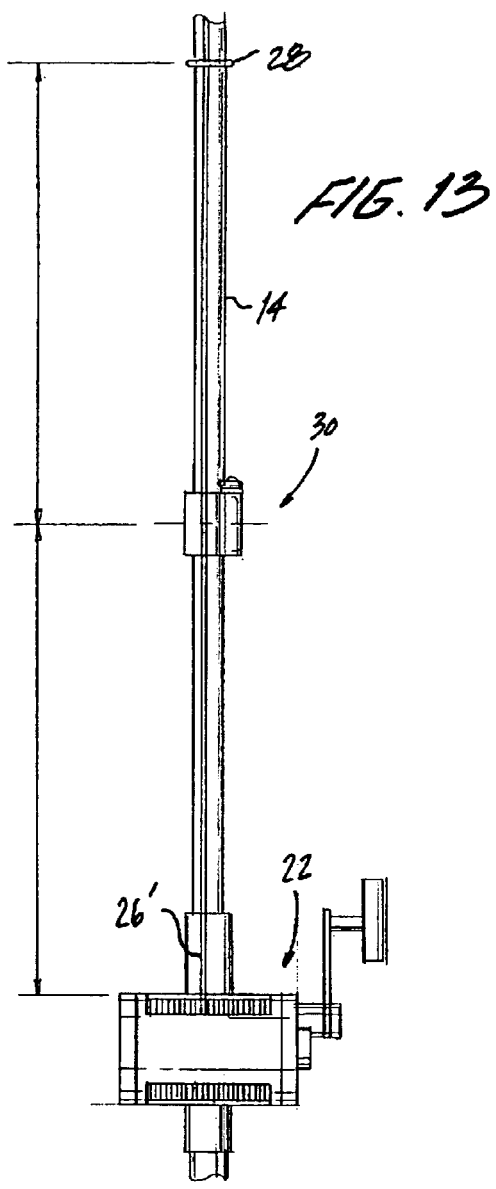
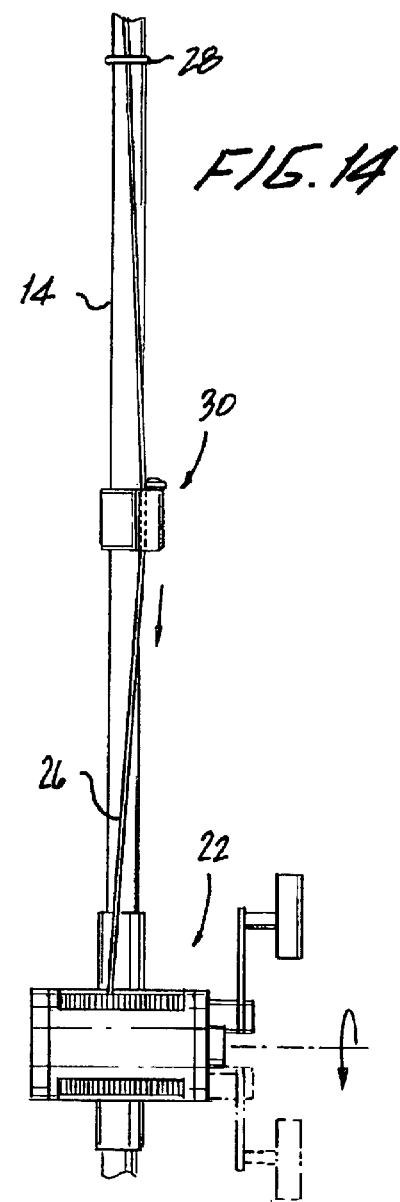
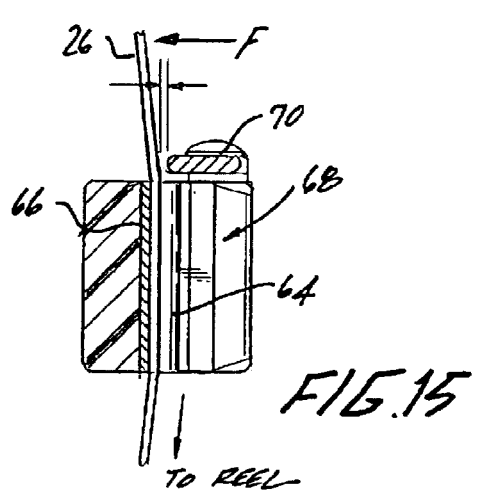
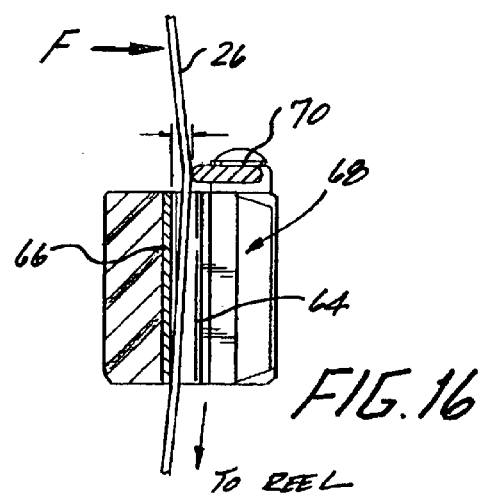

METHOD AND APPARATUS FOR PREVENTING TANGLING OF A FISHING LINE

FIELD OF THE INVENTION

The present invention relates to accessories for fishing rods and, more particularly, a tangle prevention accessory to prevent slack and avoid looping of a fishing line as it is recoiled onto a spool.

BACKGROUND OF THE INVENTION

It is a common experience to those who engage in the sport of fishing to experience tangles in a fishing line. In one typical circumstance, tangling of a fishing line may occur during retrieval of line previously cast to a desired location, with bait or a lure secured to the end of the fishing line. Such occurrences of tangling may occur with either of two common types of fishing reels, known generally as spinning reels and baitcasting reels. In a spinning reel, a rotationally fixed spool for storing coiled fishing line thereon is mounted with its axis generally parallel to and spaced apart from the longitudinal axis of the fishing reel. A line winding device is typically mounted to rotate about the spool, and to oscillate back and forth in the axial direction of the spool as well, in order to wind fishing line onto the spool as the angler cranks the line retrieval handle. The spinning reel is positioned underneath the fishing rod in the normal use position.

In a conventional baitcasting fishing reel, a rotatably mounted line storage spool is provided with its axis of rotation transverse to and spaced apart from the longitudinal axis of the fishing rod. The baitcasting reel is typically positioned above the fishing rod in its normal use position. A line winding device may also be provided, which oscillates back and forth along the axis of the spool to evenly distribute fishing line on the spool as it is retrieved as the angler cranks the line retrieval handle.

A typical fishing rod, whether designed for use with a spinning reel or a baitcasting reel, is conventionally provided with a plurality of circular line guides mounted at spaced apart locations along the length of the fishing rod. Typically, the diameter of the circular opening of the line guides increases from a relatively small size at the rod tip to a larger size towards the handle end of the rod, with the line guide closest to the reel spaced away from the reel by a distance of, for example, about 18 inches, although this distance varies widely from one fishing rod to another, depending on such factors as the overall length of the rod, the number of line guides, the type or style or particular intended use of the fishing rod, and the manufacturer. Line guides for fishing rods designed to be used in conjunction with spinning reels typically have openings of substantially greater diameters than those for fishing rods designed to be used with baitcasting reels. This is so because the spatial location at which line designed to be used with baitcasting reels. This is so because the spatial location at which line is wound onto the spool by the line winding device follows a circular path around and diametrically outside the circumference of the forwardly directed face of the spool. In order to reduce resistance on the fishing line as it passes through the line guides, the use of larger diameter line guides reduces the angles of the path that the line must travel, both as it is retrieved and cast by the angler.

The spatial location at which fishing line is wound onto the spool of a baitcasting reel also varies as the angler turns or cranks the line retrieval handle, but the variation is generally less than that which occurs in most conventional spinning reels, because the line is wound directly onto the spool. Thus the location varies entirely within the profile of the reel, and only across the axial length of the line-holding portion of the spool itself. Nonetheless, there is still some spatial variation as the line is retrieved.

As is well known to anglers, fishing line is retrieved in a wide variety of fishing situations and circumstances. In many such instances, the fishing line is under tension during line retrieval as a result of either the drag created by bait or a lure attached to the terminal end of the line or, hopefully, a hooked fish in the process of being caught. In many other circumstances, however, fishing line is retrieved when there is little or no tension on the line. This may occur, for example, when live baitfish is swimming toward the angler, or a lure is drifting toward the angler, or vice versa, or when line is being taken up between movements of a lure through the water or along the bottom of the lake or pond or sea, or in a wide variety of other common fishing situations.

In these slack line situations, line may not be wound tightly onto the spool of the reel, both in the case of baitcasting reels and also, more particularly, in the case of spinning reels. Loosely wound line on the spool of a reel hampers both line retrieval and, more importantly, subsequent casting of line as the fishing line comes off the spool at uneven speeds and in uneven amounts. The problem is greatly exacerbated with a spinning reel because the line winding device is rotating about a rotationally fixed spool which is oscillating back and forth along its axis. This back-and-forth movement of the spool while line is being coiled around the spool tends to cause another problem which is more serious than mere looseness of the coiled line. The motion places loops in the line as it is wound onto the spool, which loops interfere with normal line retrieval and casting, sometimes so severely as to render further use of the reel impossible without intervention of the angler to untangle the line. In the most serious instances of such line looping, where the angler fails to notice the presence of a loop of line on the spool, the next successive cast can cause a larger amount of line to become terribly tangled about the spool, as the initial momentum of the line as the angler initiates the casting of the lure or bait may cause a great amount of line to envelop and overtake the loop in an unorganized fashion. In the parlance of anglers, the result is often called a "bird's nest" due to its resemblance to a randomly interwoven mass of fibers. This occurrence can be a serious annoyance for anglers, both experienced and inexperienced alike, and tends to diminish the enjoyment of the fishing experience as a whole.

An inexpensive and easy-to-use device which would reduce the frequency of, or even eliminate, the occurrence of line tangling of the type just described would represent a substantial advance in the angling arts.

SUMMARY OF THE INVENTION

In accordance with one aspect of the invention, an apparatus that reduces or prevents tangling of a fishing line that passes through one or more guides on a fishing rod is described.

In accordance with a first aspect of the present invention, an apparatus is provided for the prevention of tangling of a fishing line. The apparatus includes a housing having a first end, a second end spaced from the first end, and first and second opposing walls extending therebetween. A clamp is operative to secure the housing to the fishing rod. A bore extends through the housing, and a slot is provided in the first wall which is in communication with the bore and which is sized to receive the fishing line. A gate rigidly disposed relative to the housing impedes free passage of the fishing line from the bore and into the slot.

In accordance with a further aspect of the invention, a method for preventing tangles from forming on a cast fishing line as the fishing line is reeled in is provided. The method includes placing the fishing line under tension in a tensioner that is connected to a fishing rod at a point along the length of the fishing rod that is distal to, yet proximate to, a reel; and reeling in the fishing line onto the reel while maintaining tension distal to the reel. In a more detailed aspect of the invention, the method can include the further step of guiding the fishing line past a gate into the bore that is sized to receive and maintain the fishing line under tension. In still a further detailed aspect of the invention, the method can include the additional step of releasing the fishing line from the tensioner after the fishing line has been reeled in so as to permit casting of the fishing line.

These and other aspects, features and advantages can be better appreciated from the accompanying figures and detailed description of a preferred embodiment.

BRIEF DESCRIPTION OF THE DRAWINGS

FIG. 6 is a front perspective view of the embodiment of FIG. 1 showing the fishing line retained by a gate and additionally showing (in phantom line) the position of the fishing line when it is not retained in the device;

FIG. 7 is an elevated view of the bore taken along sightline 7—7 of FIG. 6;

FIG. 8 is an elevated view of a variation in which the top surface (FIG. 4) is tapered;

FIG. 9 is an elevated view a variation in which the gate is tapered;

FIG. 10 is an elevated view of a variation in which a shim is introduced between the top surface of the housing and the gate;

FIG. 13 is a plan view of the preferred embodiment mounted on a fishing rod with the fishing line disengaged from the device of the present invention;

FIG. 14 is similar to FIG. 13, with the fishing line now shown engaged to the device of the present invention;

FIG. 15 is a sectional view showing the fishing line during winding onto the reel; and FIG. 16 is similar to FIG. 15 showing the fishing line at another location during winding onto the reel.

DETAILED DESCRIPTION OF THE PREFERRED EMBODIMENT

By way of overview and introduction, the present invention concerns a device and method for preventing tangling of a fishing line as the line is wound onto a spool of a fishing reel, either of the spinning or baitcasting type, although the invention is thought to be more useful when used in conjunction with spinning reels and fishing rods designed particularly for use with such spinning reels. The invention has utility with regard to both fresh water and salt water fishing equipment.

Figure 1:
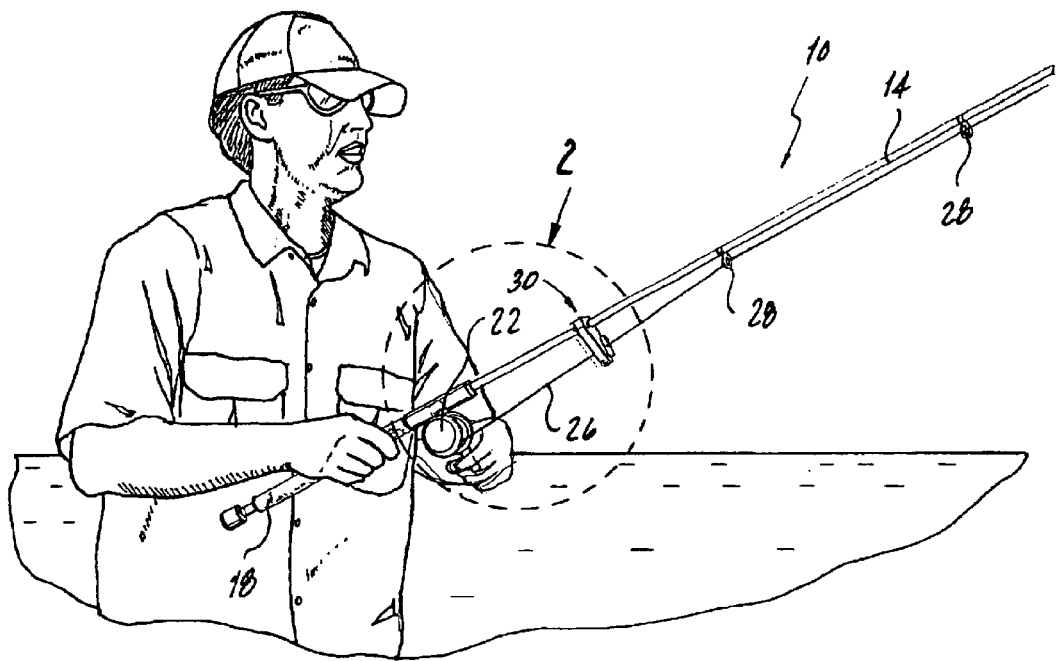
FIG. 1 is a perspective view of a preferred embodiment of the present invention installed on a fishing rod.
Figure 2:
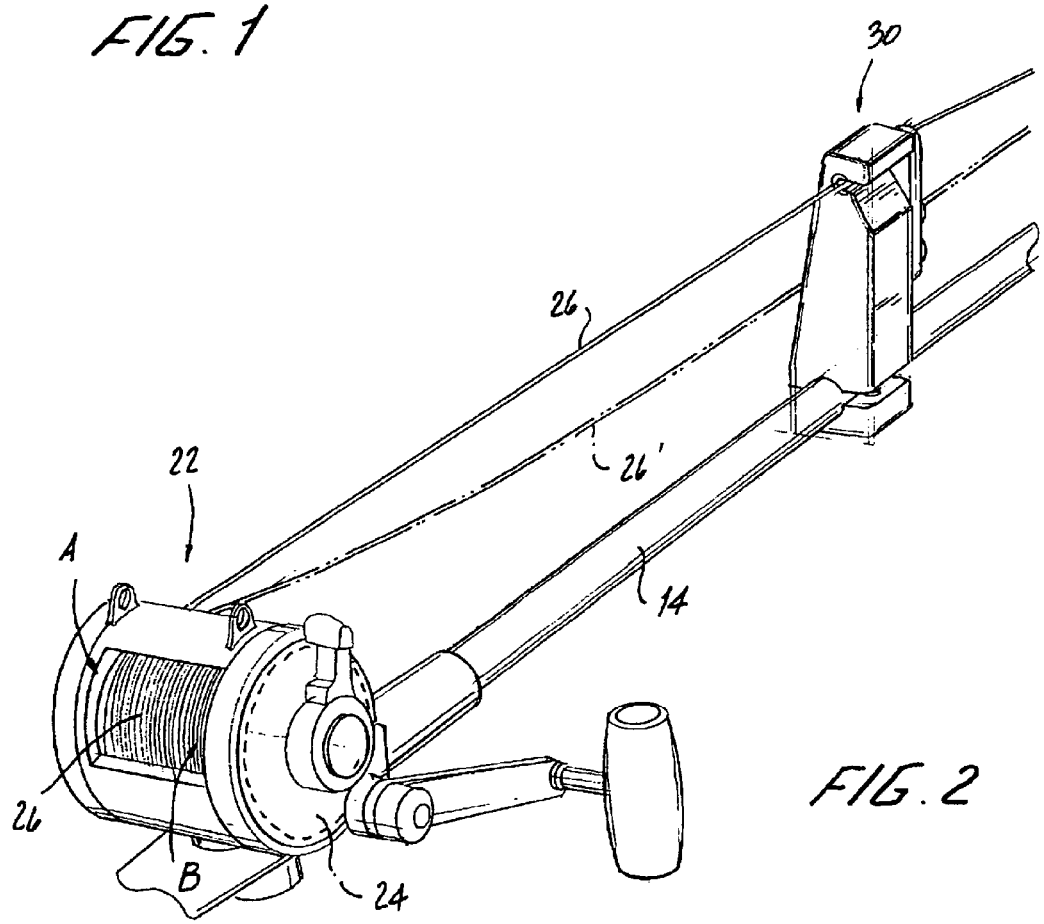
FIG. 2 is an inverted perspective view of the embodiment of FIG. 1 showing engaged (solid line) and disengaged (in phantom line) views of the fishing line.

With reference to FIG. 1, a fishing rod 10, typically includes a shaft 14, a handle 18, a reel 22, fishing line 26, and a plurality of line guides 28. The shaft 14 is normally conical in shape, such that it is wider at the proximal end, near the handle 18, than at the distal end of the shaft 14. This conical shape provides the shaft 14 rigidity at the proximal end, near the handle 18 and reel 22, while allowing the distal end of the shaft to be flexible so that it does not break when the fisherman reels in his catch. With reference to FIG. 2, the reel 22 contains a spool 24 for storing the fishing line 26. The fishing line 26 is connected to the spool 24 at one end and to a hook (not shown) at the tip of the distal end of the shaft 14. The fishing line 26 is cast into the water in hopes that a fish will ensnare itself on the hook at the end of the fishing line 26. Additionally, as show in FIG. 1, fishing rods contain a plurality of linearly spaced guides 28, which generally decrease in diameter from the proximal end of the shaft 14 to the distal end of the shaft 14. These guides 28 ensure that the fishing line 26 does not substantially stray from the shaft 14 as the rod bends when tension is placed on the line and line enters the terminal guide at any non-zero angle with respect to the rod's longitudinal axis. The plurality of line guides serve to smooth the overall curve of the line so as to approximate the smooth curve of the rod, without the line making any sharp bends which greatly increase friction on the line and may cause premature wear or even breakage of the line. After casting, the guides 28 in combination with the reel 22 create a natural resting position that the fishing line tends toward, as shown in FIG. 2 by the phantom fishing line 26'.

Figure 3:
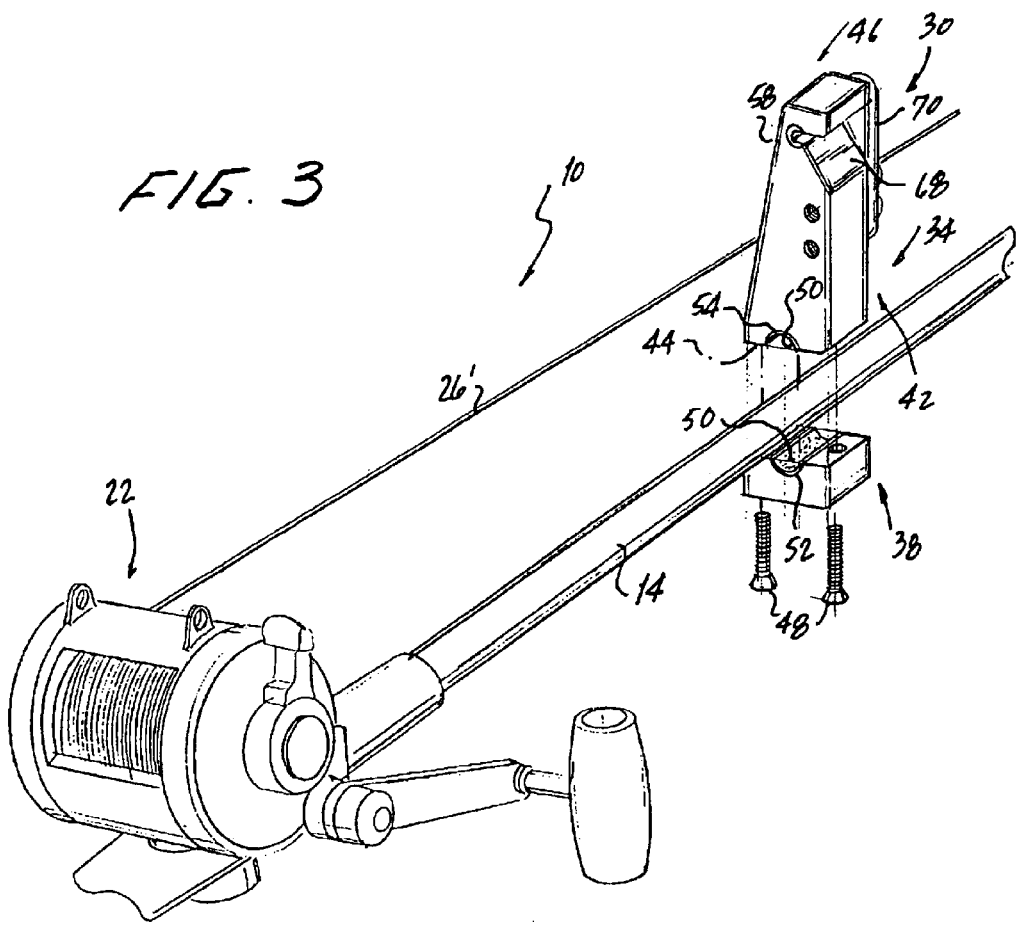
FIG. 3 is an exploded, inverted perspective view of the embodiment of FIG. 1.

With reference to FIGS. 1 and 3, the apparatus 30 of the present invention is clamped onto the fishing rod 10 at a distance that is sufficient to prevent tangling of the fishing line 26 around the spool 24 inside the reel 22 upon winding. If the apparatus 30 is placed too close to the reel 22, the fishing line 26 can become knotted before the line has an opportunity to pass through the bore 64 of the apparatus 30. If the apparatus 30 is placed too far from the reel 22, the natural resting position of the fishing line 26 will encompass the deflection caused by the apparatus 30 and defeat the purpose of the apparatus 30. With reference to FIG. 1, the apparatus 30 is preferably clamped approximately one foot from the handle of the rod. With reference to FIG. 3, a clamp is provided to secure the rod shaft 14 to the housing 34 of the apparatus 30. The preferred method of clamping the apparatus 30 onto the shaft 14 is one that allows the user to remove the apparatus 30, yet securely fastens the apparatus 30 to the shaft 14. According to one embodiment, a movable arm 38 is screwed into the base 44 of the first end 42. Tightening the screws 48 moves the arm 38 linearly toward the shaft 14 and against the housing 34. A bushing 50 can be introduced around the shaft 14 to increase the surface area that is contacted between the shaft 14 and the housing 34. This increase of contacted surface area operates to increase the grip between the housing 34 and the shaft. The first portion of the bushing 50 is seated in the arm groove 52 of the movable arm 38. The second portion of the bushing 50 is seated in the first end groove 54 of the base 44 of the first end 42 of the housing 34. The bushing 50 is preferably made of foam; however, rubber or other soft, deformable materials can be used. Moreover, the bushing 50 itself can be cylindrical or conical. A conical bushing (not shown) is preferable as it better conforms to the conical shape of the shaft 14. There are many available variations suitable for clamping the apparatus 30 onto the shaft 14 including the use of buttons, interlocking slots, snaps, welds, and glues.

Figure 4:
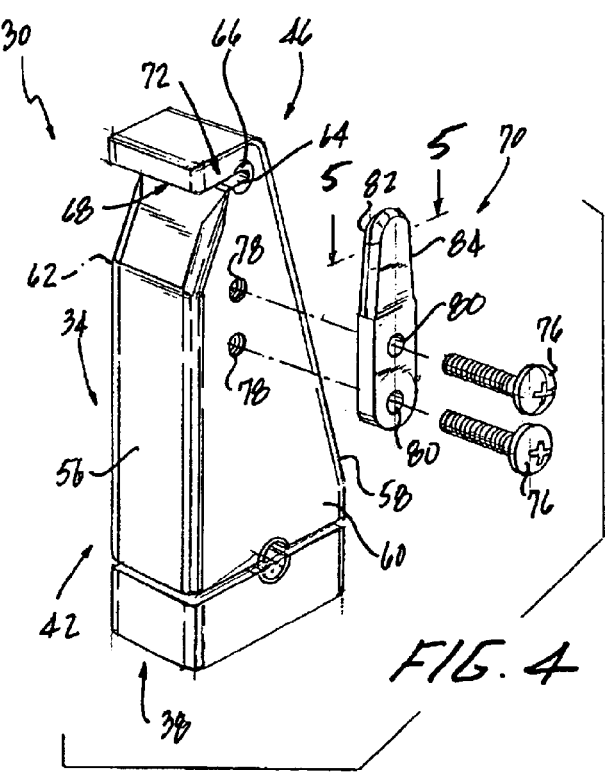
FIG. 4 is a top perspective view of the embodiment of FIG. 1.

With reference to FIGS. 3 and 4, the housing 34 of the apparatus 30 is such that it has a first end 42 and a second end 46 that are spaced apart from each other. This spacing defines the length of the apparatus 30, which must be short enough to deflect the fishing line 26 from its natural resting point, as shown in FIG. 2 as the phantom fishing line 26', yet long enough so that the fishing line 26 is not unduly stressed. The housing 34 also has a first wall 56 and a second wall 58 which oppose each other. These first 56 and second 58 walls are spaced a sufficient distance apart from each other such that the dimension of the housing 34 allows the housing 34 to withstand the normal amount of force it would undergo during the winding of a fishing line 26 without breaking. The second wall 58 extends from the first end 42 to the second end 46 such that the top surface 60 is wider at the first end 42 than the bottom surface 62 is at the second end 46. With reference to FIG. 3, the second wall 58 is constructed in a manner that reduces the interference, labeled i, between the second wall 58 of the apparatus 30 and the fishing line 26. A preferred construction of the second wall 58 to reduce the interference, i, is extending the second wall 58 from the first end 42 to the second end 46 in a substantially straight line. The housing 34 and movable arm 38 should be made of material with sufficient qualities to withstand the force it would undergo during repeated winding of the fishing line 26. In an exemplary embodiment the housing 34 and movable arm 38 are made of a hard solid plastic. There are, however, many other obvious variations including: hollow plastic, silicon carbide, ceramic, graphite epoxy, metals, porcelain and the like.

With reference to FIG. 4 the apparatus 30 of the preferred embodiment has a bore 64 near the second end 46 that extends through the housing 34 from the top surface 60 to the bottom surface 62. The bore 64 is preferably lined with a liner 66 made of a material of sufficient hardness to resist cutting by the fishing line 26 as the line is repeatedly wound through the bore 64 under resistance. In a preferred embodiment, the liner 66 is made of brass. It should be understood by those of skill in the art that various other materials can be used such as aluminum and other metals, silicon carbide, porcelain, ceramic, hard plastic, and the like. The slot 68 is in communication with the bore 64 and is sized to receive the fishing line 26. Additionally, the slot 68 extends into the liner 66.

The line diameter is a function of the material, its breaking strength, and its manufacturer, typically indicated in "pounds test" such as 14-lb. test line. Line which might be used with spinning gear comes in values ranging from 2-lb. test to perhaps as high as 40-lb. test line, or more. A preferred slot size for a line having a diameter approximately of 17 mils is 25 mils. Clearly, however, other line diameters can be accommodated, with a slot of that size.

Figure 5:
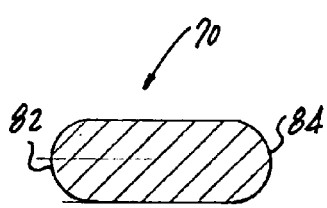
FIG. 5 is a sectional plan view taken along cut line 5—5 of FIG. 4.

With reference to FIG. 4, the gate 70 operates to keep the fishing line 26 from dislodging after it has been engaged. To achieve this, the gate 70 should be rigidly disposed on the top surface 60. A preferred way to dispose the gate 70 relative to the top surface 60 is with screws 48, however, obvious variations include: buttons, slots, rivets and snaps. The screws 48 are received into the through bores 78. Threading the through bores 78 though the housing 34 allows the gate 70 to be interchangeably mounted onto the top surface 60 or bottom surface 62 of the housing 34. The ability to mount the gate 70 onto either the top 60 or bottom 62 surfaces permits the apparatus 30 to be used by either right or left handed persons with the housing mounted to the fishing rod so that the gate 70 is on top. Additionally, the through bores 80 in the gate 70 are slightly over-sized. Slightly over-sizing through bores 80 allows the gate 70 to be positioned at various angles relative to the bore 64. These various angles enable the user to modify the size of the slot 68 thereby increasing or decreasing the resistance the fishing line 26 experiences as it is wound through the bore 64 of the apparatus 30. The preferred angle is one that is substantially perpendicular to the bore 64. It is preferred that the gate 70 be made from a material of sufficient hardness to resist being cut after experiencing multiple recoils. The preferred material is brass, however, other obvious variations include: aluminum and other metals, porcelain, ceramic, silicon carbide, hard plastic, graphite epoxy and the like. As shown in FIG. 5, to prevent the gate 70 from cutting the line, the gate 70 includes rounded edges 82 and 84 at which it contacts the fishing line 26. As shown in FIG. 6, the gate 70, is positioned to overlay a first portion 72 of the bore 64 and is clear of a second portion 74 of the bore 64.

With further reference to FIG. 6, when the fishing line 26 is threaded through the bore 64 of the apparatus 30, the natural resting position of the fishing line 26 is deflected, as shown at 86. It is the bore 64 that introduces the deflection 86 in the fishing line 26 as the fishing line 26 passes through the bore 64. This deflection in the fishing line 26 provides the resistance to keep the fishing line 26 relatively taut and thereby prevent tangling during winding of the line onto the reel. In a preferred embodiment, slack and radial motion are reduced by vertically aligning the bore 64 with at least one of the guides 28 to create the desired deflection, as shown in FIG. 1.

With reference to FIGS. 7–10, the fishing line 26 is introduced between the bore 64 and a slot 68 in the first wall 56 through a passage 88 that is defined between the housing 34 and the gate 70. In the variation shown in FIG. 7, the passage 88 is made by grinding the gate 70 until a gap of width d is large enough to easily allow a fishing line 26 to be placed through the bore 64. In the variation shown in FIG. 8, the passage 88 is made by tapering the second wall 58 of the housing 34 until a gap of width d is large enough to easily allow a fishing line 26 to be placed through the bore 64. In the variation shown in FIG. 9, the passage 88 is made by bending or cutting the gate 70 until a gap of width d is large enough to easily allow a fishing line 26 to be placed through the bore 64. In the variation shown in FIG. 10, the passage 88 is made by placing a shim 92 of width d, between the gate 70 and the second wall 58 of the housing 34. In each of these arrangements, the width d is a width that is large enough to allow a fishing line 26 to be placed through the bore 64, but not much larger than that (in other words, the width d is just sufficient to permit passage to the line into the bore).

Figure 11:
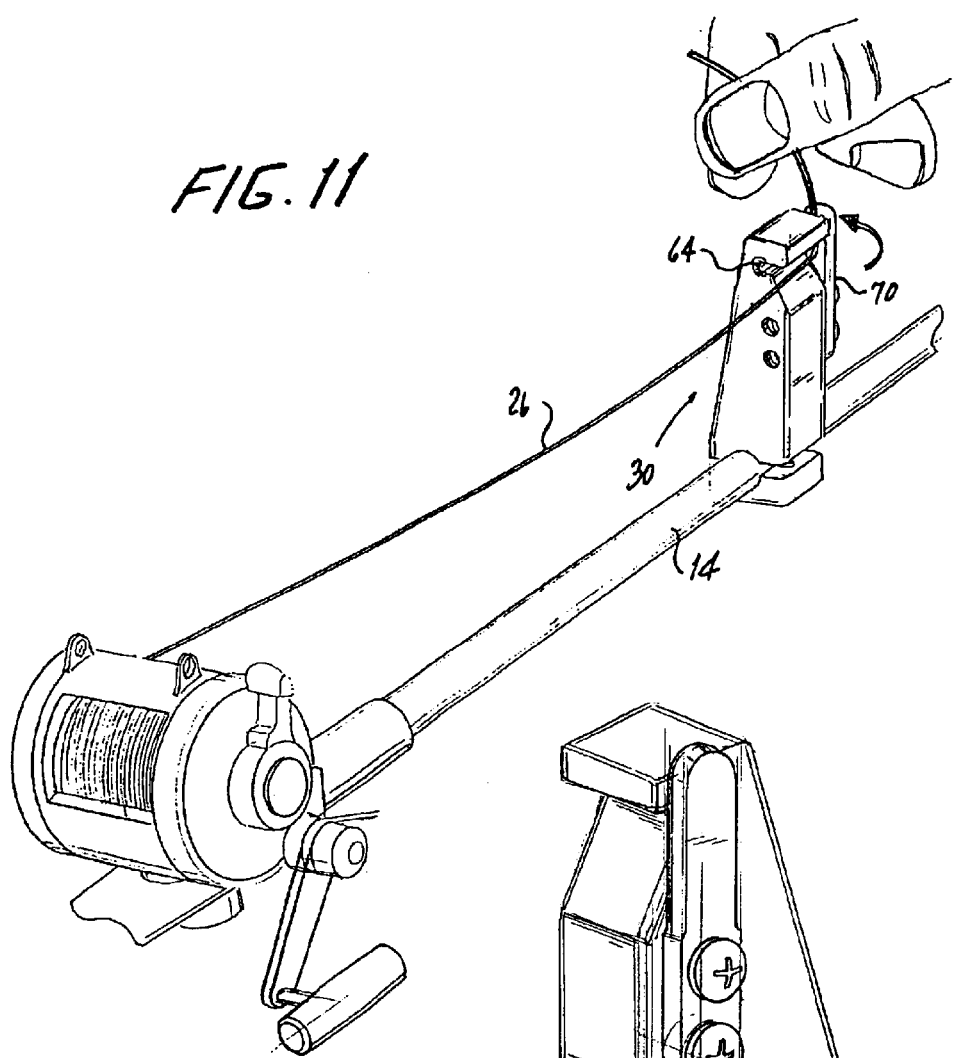
FIG. 11 is a perspective view showing the fishing line threaded through the bore.
Figure 12:
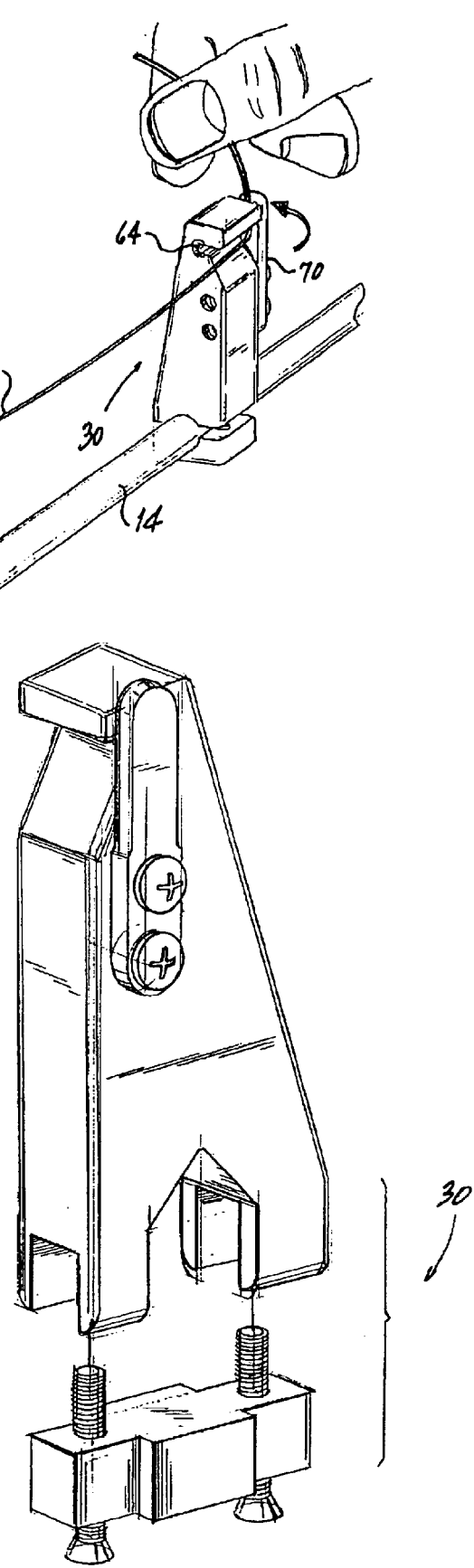
FIG. 12 is an exploded, perspective view of a second embodiment.

With reference to FIG. 12, an embodiment of the apparatus 30 used for heavier salt-water fishing rods is shown. Salt-water fishing rods may be larger in diameter and stronger than fresh-water fishing rods in order to match the heavier weight and increased strength of many salt-water game fish as compared to many freshwater species. It will be understood, however, that anglers also pursue some very large and strong freshwater fish as well, and use heavier, stronger rods and reels to do so as well. The reference herein to "salt-water fishing rods" is merely a shorthand designation for rods which are relatively heavier, stronger and larger in diameter than rods which are used for, say, large-mouth bass or other species typically weighing less than ten pounds. Another conventional way to distinguish such rods would be to use the terms "heavy action" versus "light action" rods, which general designations also vary somewhat in application from manufacturer to manufacturer. In any event, the clamping portion of the embodiment shown in FIG. 12 is larger than the clamping portion of embodiment shown in FIGS. 1, 2, 3, 4, and 11.

With reference to FIGS. 11, 13 and 14, the operation of the invention will now be discussed. As shown in FIG. 11, upontime to reel in a fishing line 26, a fisherman intent on preventing his line from tangling, places the fishing line 26 within the housing of the present invention. The fisherman places the fishing line 26 into the housing by guiding the fishing line past the gate 70 into the bore 64 that is sized to receive and maintain the fishing line. With reference to FIGS. 13 and 14, the housing has been placed at a sufficient point along the shaft 14 of the fishing rod 10 to most effectively reduce the probability of tangling. As discussed previously, if the housing is mounted too close to the reel 22, the fishing line 26 may knot before it has an opportunity to pass through the housing. On the other hand, if the housing is placed too far from the reel 22 the natural resting position of the fishing line will encompass the housing's position and defeat the purpose of the invention. Consequently, the housing should be disposed along the rod at a location that causes a deflection in the natural resting position of a fishing line 26 when the fishing line 26 is engaged with the apparatus 30. With reference to FIG. 14, once the fishing line is engaged within the housing, the fisherman reels in his fishing line 26 while maintaining a sufficient amount of resistance on the line by virtue of the housing 34 so as to optimally reduce the probability of tangling the fishing line 26. Once the line is reeled in, the fisherman detaches the fishing line from the housing in preparation to recast the line.

While the apparatus of the present invention has been particularly shown and described with reference to preferred embodiments thereof, it will be understood by those skilled in the art that various changes in form and details may be made therein without departing from the spirit and scope of the apparatus of the present invention 30.

I claim:

1. An apparatus that prevents tangling of a fishing line that passes through one or more guides on a fishing rod, comprising:

a housing having a first end, a second end spaced from the first end, and first and second opposing walls extending therebetween;

a clamp operative to secure the fishing rod to the housing;

a bore extending through the housing;

a slot in the first wall and in communication with the bore, the slot being sized to receive the fishing line and being positioned so as to receive the fishing line while the clamp is secured to the fishing rod and to permit passage of the fishing line into the bore and out from the bore; and a gate rigidly disposed in spaced relation to the housing between the bore and the first wall so as to define a passage that impedes free passage of the fishing line out from the bore and into the slot yet which permits the fishing line to be guided by a fisherman into the bore.

2. The apparatus of claim 1, wherein the bore extends through to top and bottom surfaces of the housing and wherein the second wall extends from the first end to the second end such that the top and bottom surfaces are wide at locations proximate the first end and comparatively narrow at locations proximate the second end.

3. The apparatus of claim 2, wherein the second wall extends from the first end to the second end in a substantially straight line.

4. The apparatus of claim 1, wherein the clamp comprises a movable arm that urges the fishing rod against the first end of the housing.

5. The apparatus of claim 4, further comprising threading in the first end of the housing, and screws mounted in the movable arm, whereby rotation of the screws moves the arm linearly.

6. The apparatus of claim 1, further comprising a bushing between the clamp and the housing, the fishing rod being seatable in the bushing.

7. The apparatus of claim 1, further comprising a liner disposed within the bore, the liner comprising a material having a hardness sufficient to resist cutting by the fishing line as the fishing line is advanced through the bore under tension.

8. The apparatus of claim 7, wherein the slot extends through the liner.

9. The apparatus of claim 2, wherein the gate overlies one of the top and bottom surfaces.

10. The apparatus of claim 2, wherein the gate is disposed at an angle relative to the bore.

11. The apparatus of claim 10, wherein the gate is disposed substantially perpendicular to the bore.

12. The apparatus of claim 2, further comprising a passage defined between the housing and the gate, the passage being sized to receive and transfer the fishing line between the bore and the slot.

13. The apparatus of claim 12, wherein the bore is vertically aligned with at least one of the guides, the gate overlies a first portion of the bore and is clear of a second portion of the bore, the gate preventing the line from becoming dislodged, and the bore introducing a kink in the fishing line as the fishing line passes through the bore.

* * * * *